Feb. 24, 1959  J. W. OEHRLI  2,874,592
SELF-CONTROLLED VARIABLE SPEED PLANETARY TYPE DRIVE
Filed Nov. 7, 1955  5 Sheets-Sheet 1

INVENTOR.
JOHN W. OEHRLI
BY
Attorney

INVENTOR.
JOHN W. OEHRLI
BY
Attorney

INVENTOR.
JOHN W. OEHRLI
BY
Attorney

United States Patent Office 2,874,592
Patented Feb. 24, 1959

2,874,592

SELF-CONTROLLED VARIABLE SPEED PLANETARY TYPE DRIVE

John W. Oehrli, Los Angeles, Calif., assignor to McCulloch Motors Corporation, Los Angeles, Calif., a corporation of Wisconsin Application November 7, 1955, Serial No. 545,420

14 Claims. (Cl. 74—796)

This invention relates in general to power plants, such, for example, as those employed to drive automotive vehicles, and relates in particular to an arrangement wherein the variable speed engine employed to supply power for propelling the vehicle drives the accessory equipment of the power plant in a manner to avoid power wastage and also to avoid overspeeding and excessive wear of the equipment.

It is an object of the invention to provide a power plant including a variable speed engine and accessory equipment, having a simple means for driving the accessory equipment, incorporating a variable ratio transmission which automatically reduces the ratio of the speed of the accessory equipment to the speed of the engine crankshaft.

It is customary, in power plants for automotive equipment, for example, to drive the accessory equipment, for example, cooling fan, electrical generator and water circulating pump, of the engine. The drives for this accessory equipment are directly connected to the engine crankshaft and therefore are driven at speeds proportionate to the engine speed. This results, when the engine is operated at high speed, in overspeeding of the rotating parts of the accessory equipment so that there is an unnecessary consumption of power and also excessive wear of bearing parts and of generator brushes. In some instances there is an actual reduction in the efficiency of operation of equipment. In my present invention, the fan-engine speed ratio decreases as the speed of the engine is increased and therefor overspeeding and power wastage is avoided. As an example, one installation may be recited wherein use of the present invention resulted in a fan-speed of 2,650 R. P. M. when the engine was operated at 4,000 R. P. M. instead of the customary fan-speed of 3,600 R. P. M., a reduction of about 60% from the horsepower required to operate the fan at 3,600 R. P. M.

It is a further object of the invention to provide a power plant including an engine and accessory equipment, wherein a variable ratio transmission of the character described in the foregoing is mounted on the engine at one end of the engine crankshaft, this variable ratio transmission having an output member for deliverying power to the accessory equipment to drive the same. In the preferred practice of the invention the output member includes a wheel member such as a sheave, over which a belt runs.

It is an object of the invention to provide as a part of this power plant a ball type transmission having inner and outer race rings and wherein variation of the speed ratio is accomplished by radial shifting of the balls.

It is a further object of the invention to provide a transmission wherein the complementary race rings are resiliently contracted and wherein centrifugal force acts within the balls to cause them to shift radially outwardly and thereby vary the speed ratio of the transmission.

A further object of the invention is to provide a variable speed transmission wherein force is applied in axial direction to contract the inner race rings, thereby shifting the balls radially outwardly so as to change the speed ratio of the transmission.

It is a further object of the invention to provide a variable ratio transmission wherein the force for contracting the inner race rings is applied in part by use of a fluid pressure under control of valve means operated in a given relation to the speed of the engine shaft.

It is an important object of the invention to urge complementary race rings relatively toward each by one or more springs having a negative rate. In springs as normally used, the force or reaction exerted increases as the deflection increases and decreases as the deflection decreases. In my present device I employ a spring, the force of which increases as the deflection of the spring decreases, thereby applying greater spring force at a time when the race rings occupy positions which requires greater force for the maintenance thereof.

A further object of the invention is to provide a novel means for multiplying the spring-applied pressure of a dished annular spring by use of an annularly arranged fulcrum.

Further objects and advantages of the invention may be brought out in the following part of the specification wherein many details of construction have been explained in order to produce a competent disclosure, without intending to limit the scope of the invention which is set forth in the appended claims:

Referring to the accompanying drawings which are for illustrative purposes only.

Figures 1, 2:
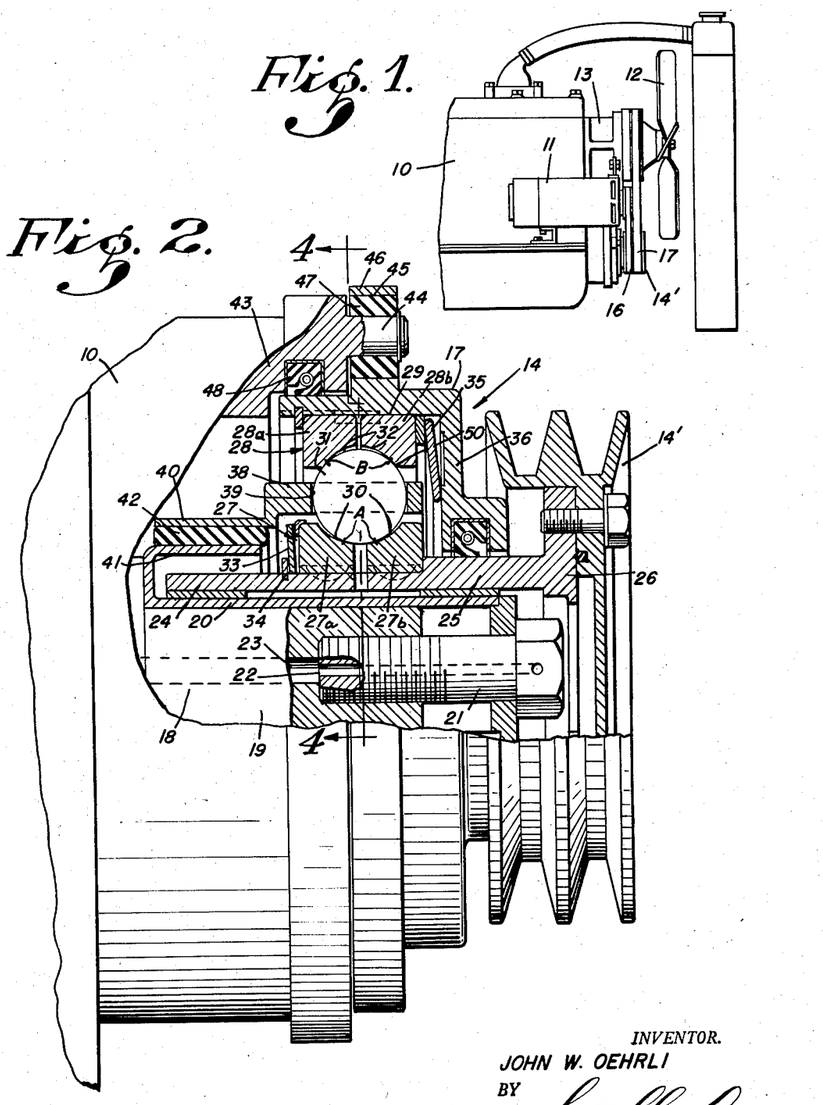
Fig. 1 is a schematic fragmentary elevational view showing a power plant according to the invention.
Fig. 2 is an enlarged fragmentary sectional view of the variable speed transmission shown in Fig. 1.

The power plant shown in Fig. 1 includes an internal combustion engine 10, an electrical generator 11, a fan 12 and a water pump 13. On the front end of the engine there is a variable ratio transmission, arranged to be driven by the crankshaft of the engine 10 and having a dual sheave 14' over which the generator and fan drive belts 16 and 17 run.

Figure 4:
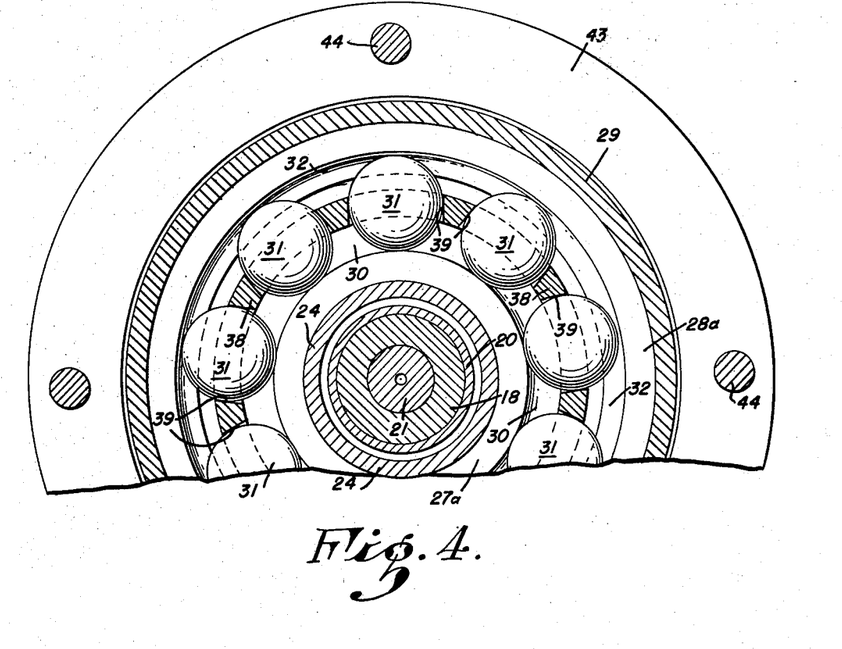
Fig. 4 is a fragmentary sectional view taken on the line 4—4 of Fig. 2.

Referring to Figs. 2 and 4, the variable ratio transmission 14 comprises a support 17 consisting of a housing connected to the front end of the engine 10 in alignment with the front end of the engine crankshaft. In the form of the invention shown in Fig. 2, the engine crankshaft 18 has an extension 19 on which a sleeve bearing 20 is secured by screw means 21 having axially thereof an oil passage 22 communicating with the oil passage 23 of the crankshaft 18.

Upon the bearing 20 there is an inner member 24 provided with a cylindrical extension 25 which projects forwardly (rightwardly) to the exterior of the support 17 and has thereon a flange 26 to which the sheave 14' is bolted. Surrounding a portion of the member 24 there are inner and outer ball races 27 and 28. Each of these races 27 and 28 is split. That is to say, it is divided into two complementary parts. For example, the inner race 27 consists of rings 27a and 27b arranged on the member 24 so that they will not rotate upon the member 24 but will rotate therewith, and may be moved axially toward each other. Similarly, the outer race 28 comprises rings 28a and 28b supported by a cylindrical wall 29 of the support 17. The rings 28a and 28b are non-rotatable in the support 17, but the ring 28b may be moved axially with relation to the ring 28a. The rings 27a and 27b of the inner race 27 and the rings 28a and 28b of the outer race 28 are complementary in that the inner rings 27a and 27b have faces 30 which cooperate to form an inner raceway in which balls 31 may roll, and the outer race rings 28a and 28b are provided with faces 32 cooperating to form a raceway to receive the outer portions of the balls 31. The inner race rings are contracted at times which will be hereinafter explained by an annular dished spring 33 which acts between a securing ring 34 on the member 24 and the peripheral portion of the leftward face of the ring 27a to urge the ring 27a toward the ring 27b. Similarly, a dished annular spring 35 acts between a radial wall 36 of the support 17 and the ring 28b to urge it toward the ring 28a.

The balls 31 are caused to roll in the outer race 28, and thereby effect revolution of the inner race 27 and the member 24, by a drive member consisting of a cylinder 38 arranged between the inner and outer races 27 and 28 and having therein radial openings 39 to receive the intermediate portions of the balls 31. The ball driving ring 38 is rotated by a connection with the engine shaft 18, such connection comprising a leftwardly projecting cylindrical extension 40 on the ring 38, a cylindrical member 41 mounted on the shaft 18 so as to be driven thereby, and a rubber ring 42 arranged between the cylindrical members 40 and 41 and being adapted to transmit rotation from the member 41 to the member 40, the rotation of the driving ring 38 being increased and decreased in speed in keeping with the changes in speed of the engine shaft. The force applied by the ring 38 to the balls causes them to act against the races 27 and 28, tending to rotate members 24 and 17 which support them in forward direction, but the member 17 causes the race ring 28 to have reaction against the balls 31 so that they will drive the race 27 and the member 24.

The support 17 is resiliently mounted on the front of the engines so that its position of alignment with the crankshank 18 will be determined by the races 27 and 28 and the balls 31 will roll therein. An annular wall 43 is fixed on the front end of the engine in surrounding relation to the projecting end of the crankshaft 18, and a pin 44 projects from the annular wall 43 through an opening 45 in a radial projection 46 which is formed upon the support 17. A rubber bushing 47 is arranged in the opening 45 and surrounding the pin 44 to yieldably connect the support 17 to the engine so that the variable ratio transmission may have movement in accordance with any eccentricity which the crankshaft extension 19 may have. A yieldable sealing ring 48 is arranged between the annular wall 43 and the support 17.

When the engine is idle or rotating at low speed the spring 35 will force the race ring 28b leftwardly into a position close to the race ring 28a as shown in Fig. 1. At this time the inner race rings 27a and 27b will be separated. It will be perceived that this time the balls 31 will engage the surfaces of the inner rings 27a and 27b at points A near the radially inward margins of the surfaces 30. It will be further perceived that the outer portions of the balls 31 engage the surfaces 32 of the outer race rings 28a and 28b at the points B near the radially inward margins 50 of the faces 32. At this time the transmission will be at its highest driving ratio. By this, we refer to the ratio of the speed of rotation of the sheave 14' to the speed of rotation of the engine shaft 18.

Figure 3:
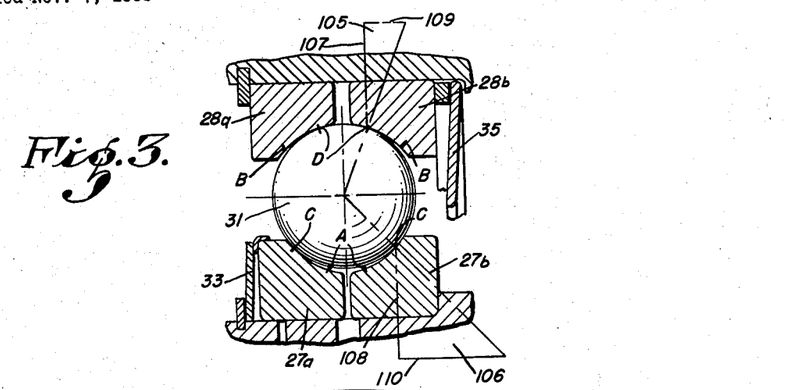
Fig. 3 is an enlarged fragmentary schematic view showing the manner in which the relative positions of the race rings and balls effect a change in the speed ratio of the transmission and also indicating the forces and reactions involved.

The rate at which the balls 31 revolve bodily around the axis of the shaft 18 is the same as the rate of rotation of the shaft 18. Therefore, as the speed of the shaft 18 increases the centrifugal force acting radially outwardly in the balls 31 will increase, and as the value of this centrifugal force increases the balls 31 will move outwardly from the positions in which they are shown in Fig. 1 toward the position in which they are shown in Fig. 3, spreadng the race rings 28a and 28b and allowing the inner race 27 to contract. By "contract" is meant the movement of the race 27a toward the race 27b by the spring 33. This results in a reduction in the speed of the sheave 14' proportionate to the speed of rotation of the shaft 18. When the transmission 14 is in its lowest ratio, the balls 31 will engage points C in the surfaces 30 of the inner race rings 27a and 27b and will engage points D in the surfaces 32 of the outer race rings 28a and 28b.

Figure 9:
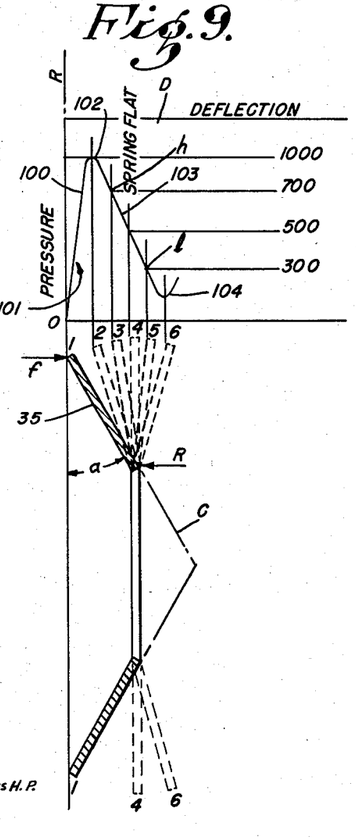
Fig. 9 is a schematic, graphical diagram showing the characteristics of the negative rate spring forming a part of the invention.

In Fig. 9 there is a schematic representation of the spring 35. In its initial relaxed state as shown in full lines at 1 in Fig. 9, the dished spring 35 consists of an annular wall which is a portion of a cone C. It will be understood that in the manufacture of the spring 35 the angle $a$ will be much smaller than that which is shown in Fig. 9 for purpose of illustration. If a force is applied to the periphery of the ring 35 as indicated at $f$ and a reaction R is applied to the inner edge of the ring as indicated at R, the wall of the ring 35 may be caused to swing from the initial or relaxed position indicated at 1 through the positions indicated by the numerals 2 to 6. In position 4 the spring 35 is flat. As the spring is flexed from position 1 to position 2 which is approximately halfway between positions 1 and 4, the reaction of the spring, that is to say, the force which it exerts in tending to return to position 1, will rise as indicated by the portion 100 of the curve 101 of the force diagram D to maximum 102. Then, as the spring 35 is flexed from position 2 through positions 3, 4 and 5 to position 6 the reaction of the spring will pass through a negative stage as indicated by the portion 103 of the curve 101 to a relatively low value 104.

From the diagram D it will be perceived that when the spring 35 is flexed into a reversely dished position, indicated at 6, the force which it is capable of exerting in trying to return to position 1 will be at a comparatively low value, and that as the spring 35 is permitted to return from position 6 through positions 5, 4 and 3 to position 2 the reaction which it is capable of exerting will rise as indicated by the portion 103 of the curve 101 from the low value indicated at 104 to the maximum value indicated at 102. In my variable ratio transmission I employ the dished spring 35 and other dished springs shown in the range of flexure between positions 3 and 5, which are disposed on opposite sides of the position of the spring wherein it is flat as indicated at 4. Accordingly, as the spring 35 is flexed from the position 3 through the flat position 4 to the position 5, its reaction will recede from the value indicated at $h$ to the value indicated at $l$ on the negative rate portion 103 of the curve 101. In Fig. 2 the spring 35 is shown in a position corresponding to the position 3 of Fig. 9. That is to say, the periphery of the spring 35 is exerting in leftward direction against the race 28b a relatively large force such as indicated by the value $h$ in Fig. 9. The spring 33, however, is in a position corresponding to the position 5 of Fig. 9 and therefore is exerting a relatively lower force $l$ rightwardly against the inner race 27a.

Referring to the schematic view, Fig. 3, outward movement of the balls 31 effects a spreading of the outer race rings 28a and 28b and permits contraction of the rings 27a and 27b so that the balls 31 engage the outer race rings at the point D and the inner race rings at the point C. The spring 35 is flexed from the position in which it is shown in Fig. 2 to the position in which it is shown in Fig. 3, corresponding to the position 5 of Fig. 9, so that the spring 35 at this time exerts in leftward direction a smaller force. The movement of the race 27a substantially into contact with the race 27b permits the spring 33 to relax or return from the position in which it is shown in Fig. 2 to the position in which it is shown in Fig. 3, so that the spring in Fig. 3 exerts a greater force than when positioned as shown in Fig. 2. Force diagrams 105 and 106 set up respectively on the points of intersection D and C of the balls 31 with the race rings 28b and 27b indicate equal forces 107 and 108 acting respectively radially inwardly and outwardly on the ball 31, but with respectively smaller and larger forces 109 and 110 required in axial direction, owing to the different angles of inclination at the points of contact D and C. In conformity therewith, the spring 35, subjected to greater deflection exerts a smaller force tending to move the ring 28b toward the ring 28a, and the ring 33, having been permitted to return from a position of greater deflection to a position of lesser deflection now exerts a greater force in the range of the value $h$, Fig. 9. The centrifugal force of the balls 31 acting outwardly and engaging the outer race rings 28a and 28b at the points D, have an axial component of force which supplements the spring force represented at 109, with the result that the velocity of the driving member 38, producing a corresponding centrifugal force in the balls 31 act in conjunction with the negative rate springs to control the separation and contraction of the inner and outer race rings.

By a proper proportioning of parts, including proportioning of the strengths of the springs 33 and 35, the transmission 14 may be controlled so that the balls 31 will not start to move outwardly from their inward positions shown in Fig. 1 until a speed of rotation of the crankshaft 18 greater than 1,000 R. P. M. is attained. As the balls 31 move radially outwardly from the positions in which they are shown in Fig. 2, the speed ratio of the transmission will gradually decrease. That is to say, the ratio of the speed of the sheave 14' to the speed of the shaft 18 will decrease and excessive driving speeds will not be applied to the accessories, shown as the generator 11, the fan 12 and the water pump 13, when the engine is operated at high speed.

Figure 5:
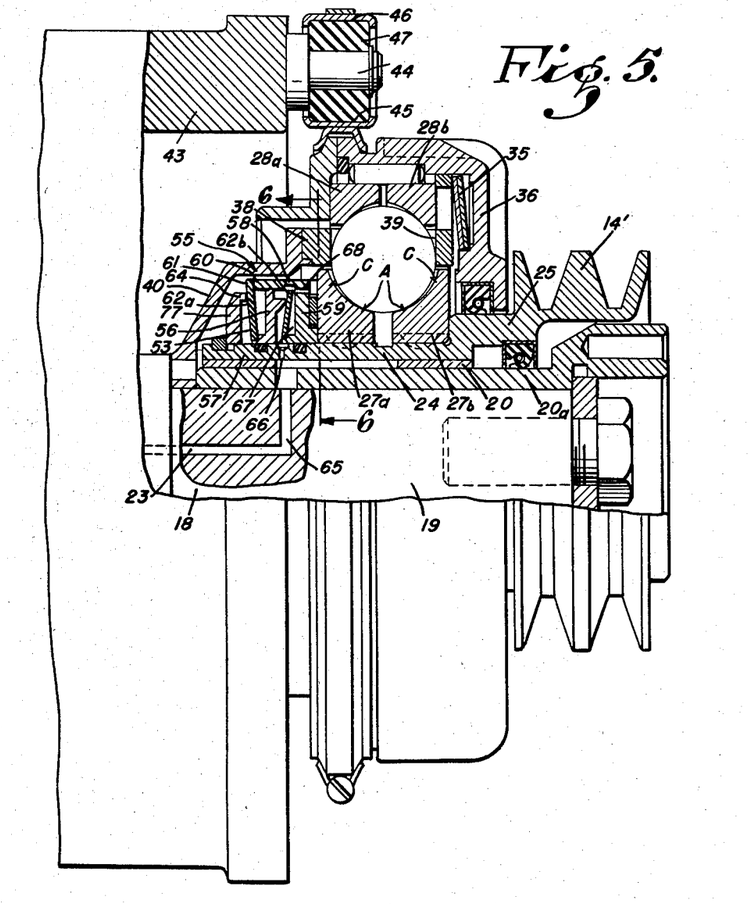
Fig. 5 is a sectional view showing a form of the variable ratio transmission actuated by fluid pressure.
Figure 6:
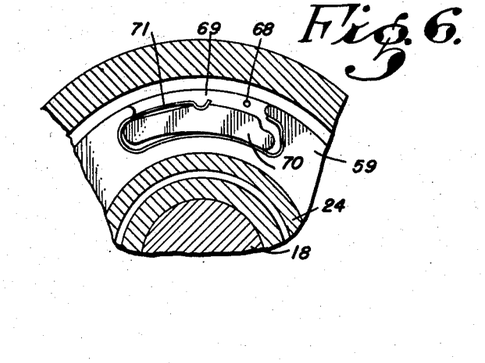
Fig. 6 is a fragmentary sectional view taken as indicated by the line 6—6 of Fig. 5.

In the form of the invention shown in Figs. 5 and 6 many of the elements described with relation to Figs. 2 and 3 are employed and accordingly similar parts have been given part numbers previously employed, the inner rotary member being supported on the shaft extension 19 by sleeve bearings 20 which surrounds a sleeve 20a which is fixed on the shaft extension and projects through the sheave 14' so as to be engageable for the purpose of turning the engine crankshaft by use of a suitable tool. In this form of the invention, however, the change in the ratio of the transmission is controlled by hydraulically actuated means. As in the form of the invention previously described, the outer race ring 28d is urged toward the ring 28a by a pair of dished annular springs 35. A fluid expanded device 55 is employed to assist dished annular springs 62a and 62b. The fluid expanded device 55 includes an annular piston 56 arranged between inner and outer cylinder walls 57 and 58, the inner cylinder wall 57 being a portion of the member 24 on which the rings 27a and 27b are mounted. The cylinder wall 58 is axially movable and has an annular end wall 59 arranged to engage the inner race ring 27a and the other end 60 thereof to engage the peripheral portion 61 of the dished annular spring 62a, the inner annular portion 53 of which engages the contiguous face of the annular piston 56. The spring 62b is arranged between the piston 56 and the cylinder end wall 59 so that its outer portion acts against the piston 56 and its inner edge reacts against the end wall 59. An annular shoulder 64 is arranged on the inner cylindrical wall 77 so as to engage an intermediate annular portion of the spring 62a, this shoulder 64 acting as a fulcrum around which the spring 62a will act in the manner of a force-multiplying lever. That is to say, when the inner annular portion 63 of the dished spring 62a moves leftwardly the spring will flatten and the peripheral portion 61 thereof will swing rightwardly around the shoulder 64, moving the cylindrical wall 58 rightwardly and shifting the inner ring member 27a toward the ring member 27b with a force which, owing to the leverage action around the fulcrum shoulder 64, is a multiple of the force which the spring is capable of exerting when used in its customary manner.

Oil under pressure for operation of the piston 56 and the cylinder 58 in opposite directions is received from the axial opening 23 of the crankshaft 18 through a radial passage 65 in the end portion 19 of the shaft 18, and through a radial passage 66 in the member 24 into the annular space 67 between the pistons 56 and the cylinder end wall 59. The end wall 59 of the cylinder 58 has therein a passage 68 which connects the internal space 67 of the cylinder 58 with the space external to the cylinder 58. The invention includes valve means adapted to control the flow of oil through the passage 68, thereby controlling the pressure acting in the space 67 and against the piston 56 to provide a force to supplement the force of the dished springs 62a and 62b.

In the external face of the end wall 59 of the cylinder 58 there is a shallow arcuate recess 69, one end of this recess intersecting the outer end of the bleed opening 68 as shown in Fig. 6. In the recess 69 there is a flat arcuate valve plate 70 retained by a spring 71 in the retracted position in which it is shown in Fig. 6 when the cylinder 58 is stationary or rotating at slow speed, the opening 68 at this time being open so that oil may escape from the chamber or space 67. As the speed of rotation of the parts 68 and 70 increases, centrifugal force acting in the valve part 70 will cause the same to swing outwardly and restrict flow of oil from the space 67 out through the passage 68. Oil pressure will then build up in the space 67 and this pressure will urge the annular piston 56 toward the fulcrum shoulder 64. The springs 62a and 62b are both negative rate dished annular springs such as described with relation to Fig. 9 and they continuously exert a pressure tending to urge the cylinder 58 in the direction of the inner race ring 27a, and owing to the fact that these springs 62a and 62b have a negative rate, they will have increased force as the inner race ring 27a is moved closer to the race ring 27b to shift the points of engagement between the inner race rings and the balls from the points A toward the points C. As the point of contact between the inner races and the balls moves from the point A to the point C, a much larger force must be applied axially. The increase in the force exerted by the springs 62a and 62b as their deflection is diminished supply substantially all of the increase in force so that the force derived from the oil pressure acting in the chamber 67 need not be large.

The contraction of the race rings 27a and 27b of Fig. 5 by movement of the piston 56 in the manner described in the drawing will result in the balls 31 being shifted radially outwardly, spreading apart the outer race rings 28a and 28b, reducing the ratio of the speed of rotation of the sheave 14' to the speed of rotation of the engine shaft 18.

Figure 8:
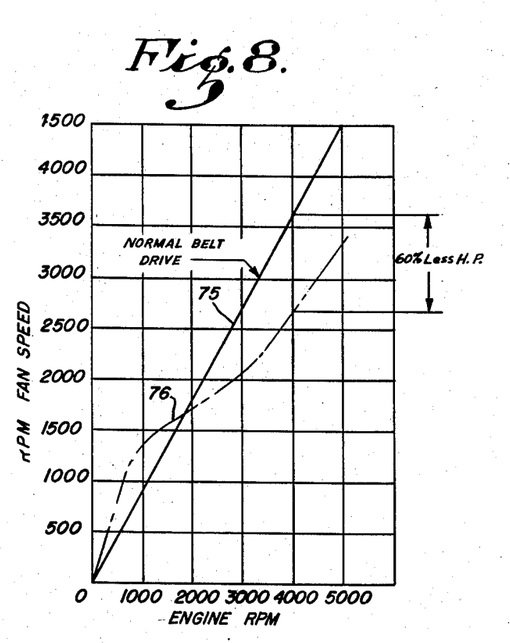
Fig. 8 is a graph showing variable ratio characteristics which may be achieved in one practice of the invention.

In the graph, Fig. 8, the line 75 indicates the speed at which the fan of an automotive power plant operates in commercial use for different engine speeds. The normal belt drive gives a speed ratio of 4.5 to 5.0. The curve 76 shows a ratio of fan speed to engine speed obtainable in the use of my invention. During very low engine speeds the fan speed is greater than that obtainable in the commercial installation. That is to say, at an engine speed of 1,000 R. P. M., the curve 76 indicates a fan speed of 1,300 R. P. M., whereas the normal belt drive provides a fan speed of about 900 R. P. M. But, as engine speed is increased, the curve 76 swings rightwardly and crosses the line 75, indicating an important reduction in the fan speed proportionate to engine speed. At an engine speed of 4,000 R. P. M., the curve 76 shows a fan speed of 2,650 R. P. M. as compared to a fan speed of 3,600 R. P. M. obtained by the normal belt drive, a difference of 950 R. P. M. in favor of the applicant's invention and a horsepower consumption by the fan 60% less than the horsepower consumed by the fan driven at 3,600 R. P. M. by the normal belt drive when the engine is operated at the high speed at 4,000 R. P. M. Improved cooling is obtained at the low engine speed because of the higher relative speed of operation of the fan.

Figure 7:
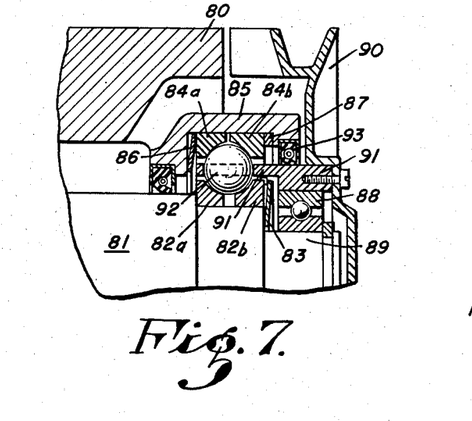
Fig. 7 is a sectional view showing another form of the variable ratio transmission adapted for the driving of an electrical generator.

In Fig. 7, I have shown a form of my automatic variable ratio transmission especially adapted for driving of automobile electrical generators. A generator 80 is indicated having a shaft 81 on which inner race rings 82a and 82b are placed so as to be non-rotatable on the shaft 81 but axially relatively movable so that a dished annular spring 83 may be employed to urge the race ring 82b toward the race ring 82a. Outer race rings 84a and 84b are supported by a cylindrical wall 85 in the housing of the generator 80. A dished annular spring 86 is arranged to urge the race ring 84a toward the race ring 84b which is restrained against axial movement in the cylindrical wall 85 by a stop ring 87. The dished annular springs 83 and 86 are both of negative rate and their action is as described with relation to the springs 35 and 33 of Fig. 2.

A ball bearing 88, secured upon the end 89 of the shaft 81 supports a sheave 90 and also a cylindrical drive member 91 which projects into the annular space between the inner and outer race rings and as described with relation to Fig. 2 has openings therein through which the balls 92 extend. A seal 93 is provided between the end of the cylindrical wall 85 and the member 91.

The sheave 90 is adapted to be rotated from the engine by a V-belt which extends thereover. It causes the balls 92 to roll in the outer race rings 84a and 84b and thereby drive the inner race rings 82a and 82b. As the velocity of the drive member 91 is increased centrifugal force acting within the balls 92 will urge them radially outwardly spreading the outer race rings 84a and 84b and permitting contraction of the inner race rings 82a and 82b, thereby reducing the ratio of the speed of the shaft 81 to the speed of the sheave 90.

Figure 10:
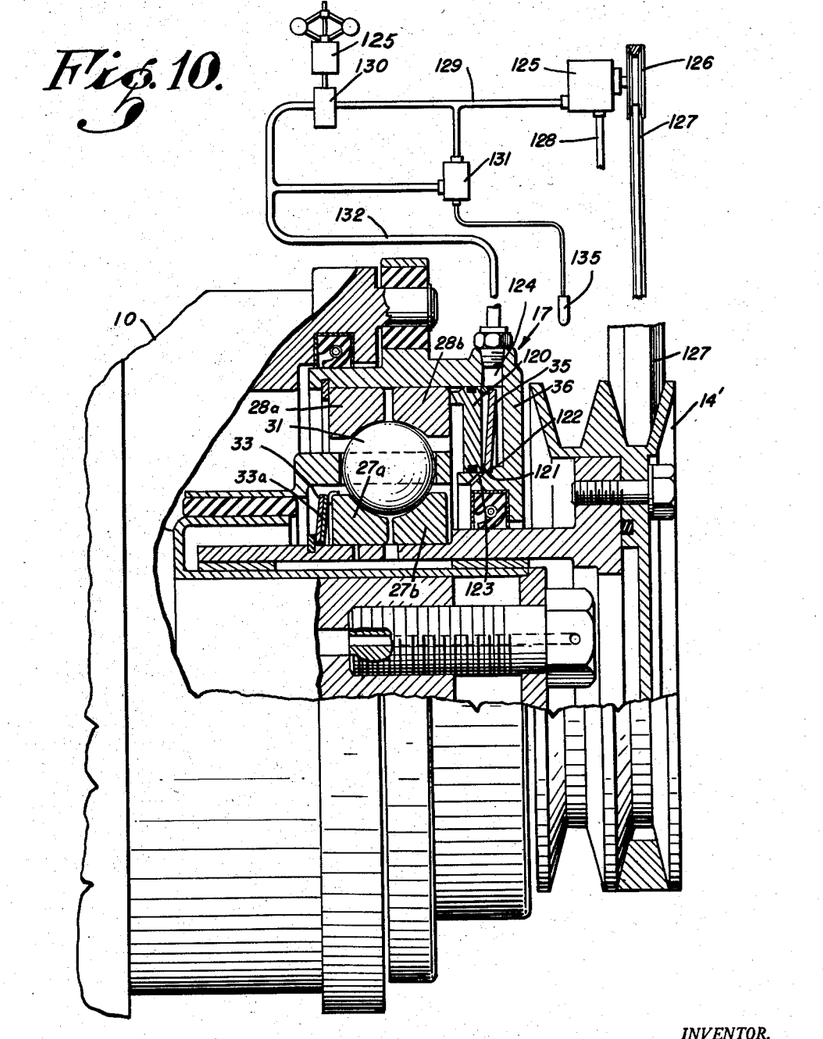
Fig. 10 is a sectional view similar to Fig. 2, but showing an alternative form of the invention having a fluid actuated control.

In Figs. 2 and 5, I have shown forms of my invention which are in part operated by centrifugal force and by fluid pressure means adapted to control the separation and approximation of the inner race rings. In Fig. 10 I show an alternative form of the invention wherein control of the speed ratio is effected by negative springs, the action of centrifugal force in the balls, and externally controlled means for effecting relative movement of the outer race rings. In Fig. 10, with the exception of certain details which will be explained hereinafter, Fig. 2 has been copied and therefore the same numerals are employed in Fig. 10 to indicate those parts which have been previously described with relation to the description and explanation of the structure shown in Fig. 2.

In Fig. 10 a transmission is shown in low ratio adjustment, the outer race rings 28a and 28b being spread apart, and the inner race rings 27a and 27b being contracted. The inner race ring 27a is urged toward the inner race ring 27b with heavy spring pressure produced by a pair of negative rate springs 33 and 33a. The outer race ring 28b is urged toward the race ring 28a by a negative rate spring 35 which is arranged so that its peripheral portion engages an annular piston 120, which in turn engages the outer race ring 28b. The annular piston 120 is slidable in an annular cylinder or cavity 121 formed in the wall 36 of the support 17. The inner margin of the annular dished spring 35 engages a shoulder 122 carried by the wall 36. A bleed orifice 123 leads from the cavity 121 to the interior of the member 17, and a fluid inlet port 124 is provided for the cavity or cylinder 121 through which fluid pressure may be delivered into the cavity 121 so that it will act leftwardly against the piston 120 to move the race ring 28b toward the race ring 28a.

The flow of fluid pressure into the cylinder 121 so as to actuate the piston 120 may be controlled by one or more of a number of different parameters. It may be controlled by the speed of rotation of a driven part and/or it may be controlled by the temperature of a mechanism. Also, the fluid pressure may be derived from a number of different sources. In Fig. 10, I have shown a hydraulic pump 125 such as employed to provide oil pressure for the operation of hydraulic brakes, steering mechanism and the like. The pump 125 is schematically indicated as having a driven sheave 126 arranged to be rotated by a belt 127, from the engine, so as to draw oil from a reservoir, not shown, through piping 128 and to deliver the same under pressure to piping 129 which extends to the inlets of control valves 130 and 131, the outlets of which are in turn connected through piping 132 with the inlet port 124 of the cylinder 121. The valve 130 is of the type which is open when the member by which it is controlled is rotating at low speed and gradually closes off flow through the piping 132 as the speed of rotation of the member increases. Specifically, the valve 130 is connected so as to be controlled by the speed of rotation of the engine shaft. The thermostat valve 131 has a liquid filled capsule 135, and as the temperature of the capsule 135 is increased the valve 131 will open from an initially closed condition. The capsule 135 is placed in the engine cooling system. When the engine is stopped there will be no pressure in the cylinder 121 and the inner and outer race rings will be adjusted by the respective springs 33, 33a and 35 for low ratio operation. Also, at this time the thermostat valve 131 will be closed and the speed controlled valve 130 will be open. When the engine starts up, the pump 125 will be driven and pressure will be fed through the valve 130 to the cylinder 121 to assist the spring 35 to shift the annular piston 120 leftwardly so as to contract the rings 28a and 28b, thereby placing the transmission in its high speed ratio. As the engine speed increases, the valve 130 will gradually close, reducing the rate of flow of oil under pressure into the cylinder 121 so that the piston 120 may move rightwardly, permitting a spreading of the outer race rings 28a and 28b toward, and eventually into, the position in which they are shown in Fig. 10, reducing the driving ratio of the transmission. Therefore, at this time the accessories, such as the fan, water pump and the oil pump 125, which may be driven by the sheave 14′ will be operated at proportionately reduced speed. However, should the engine be caused to heat up for any reason, such as for example, climbing of a steep hill, the thermostat valve 31 will open in response to the rise in the temperature of the capsule 135 and the valve 131 will permit a flow of oil under pressure into the cylinder 121 which will act leftwardly against the annular piston 120 and increase the driving ratio of the transmission.

I claim:

1. In an automatic variable ratio transmission: an inner member having inner complementary race rings thereon; means urging said inner race rings together; an outer member surrounding said inner member and having outer complementary race rings thereon facing said inner race rings; annular negative rate spring means urging said outer race rings toward each other; means supporting said members so that at least one of them may rotate around its axis and means for supporting the other of said members so that it will have reaction against rotation around said axis; balls disposed so as to roll between said inner and outer race rings; and a rotatable member engaging said balls and revolving as said balls roll between said inner and outer race rings, said balls being adapted to shift radially outwardly, thereby varying the ratio of the transmission.

2. A device as defined in claim 1 wherein said means urging said inner race rings together comprises at least one annular negative rate spring applying to said inner race rings a force which increases as said inner race rings move relatively toward each other.

3. A device as defined in claim 1 wherein said means urging said inner race rings together comprises an annular cylinder, an annular piston in said cylinder, an annular negative rate spring having its periphery engaging the other end of said cylinder and the inner edge thereof engaging said annular piston, a fulcrum member engaging the above named spring on a line between the inner edge and the periphery thereof, and means for delivering fluid under pressure into said cylinder to supplement the force of the negative rate spring which acts to effect relative movement of said cylinder in opposite directions.

4. A device as defined in claim 3 having therein a second annular negative rate spring arranged to supplement said spring which engages the outer end of said cylinder.

5. In a variable ratio transmission: an inner member having a pair of inner complementary race rings thereon; an outer member around said inner member having a pair of outer complementary race rings thereon facing said inner race rings; balls arranged between said inner and outer race rings and in rolling engagement therewith; a third member between said inner and outer race rings and having spaces for said balls; means supporting two of said members so that they may revolve around the axis of said inner and outer members; means supporting the remaining of said members so as to have reaction against rotation; a means for urging the race rings of one pair toward each other; and means for urging the race rings of the other pair toward each other, at least one of said means comprising negative rate spring means applying to said race rings a pressure which increases as said race rings move toward each other.

6. A variable ratio transmission as defined in claim 5 having therein a force applying means to supplement the force of said negative rate spring means comprising a fluid expansible member arranged adjacent one of said race rings.

7. A variable ratio transmission as defined in claim 5 having control means comprising a fluid expansible member arranged adjacent one of said race rings to apply a variable force to move the same.

8. A variable ratio transmission as defined in claim 5 wherein control means comprising a fluid expansible member is arranged adjacent of said race rings to move it axially and wherein annular negative rate spring means is arranged to assist said fluid expansible member.

9. In a variable ratio transmission: and inner member having a pair of inner complementary race rings thereon; an outer member around said inner member having a pair of outer complementary race rings thereon facing said inner race rings; balls arranged between said inner and outer race rings and in rolling engagement therewith; a third member between said inner and outer race rings and having spaces for said balls; means supporting two of said members so that they may revolve around the axis of said inner and outer members; means supporting the remaining of said members so as to have reaction against rotation; means for urging the inner race rings toward each other; and an annular cylinder and piston arranged adjacent one of said outer race rings for urging said outer race rings toward each other.

10. In a variable ratio transmission: an inner member having a pair of inner complementary race rings thereon; an outer member around said inner member having a pair of outer complementary race rings thereon facing said inner race rings; balls arranged between said inner and outer race rings and in rolling engagement therewith; a third member between said inner and outer race rings and having spaces for said balls; means supporting two of said members so that they may revolve around the axis of said inner and outer members; means supporting the remaining of said members so as to have reaction against rotation; inner negative rate spring means for urging the inner race rings toward each other; and an annular cylinder and piston arranged adjacent one of said outer race rings for urging said outer race rings toward each other.

11. In a variable ratio transmission: an inner member having a pair of inner complementary race rings thereon; an outer member around said inner member having a pair of outer complementary race rings thereon facing said inner race rings; balls arranged between said inner and outer race rings and in rolling engagement therewith; a third member between said inner and outer race rings and having spaces for said balls; means supporting two of said members so that they may revolve around the axis of said inner and outer members; means supporting the remaining of said members so as to have reaction against rotation; means for urging the inner race rings toward each other; and means comprising an outer negative rate spring means and fluid expansible means consisting of an annular cylinder and piston arranged adjacent one of said outer race rings for urging said outer race rings toward each other.

12. In a variable ratio transmission: an inner member having a pair of inner complementary race rings thereon; an outer member around said inner member having a pair of outer complementary race rings thereon facing said inner race rings; balls arranged between said inner and outer race rings and in rolling engagement therewith; a third member between said inner and outer race rings and having spaces for said balls; means supporting two of said members so that they may revolve around the axis of said inner and outer members; means supporting the remaining of said members so as to have reaction against rotation; inner negative rate spring means for urging the inner race rings toward each other; and means comprising an outer negative rate spring means and fluid expansible means consisting of an annular cylinder and piston arranged adjacent one of said outer race rings for urging said outer race rings toward each other, said inner negative rate spring means is of a strength relative to said outer negative rate spring means to adjust the transmission to its low ratio state when there is no fluid pressure in said fluid expansible means.

13. In a variable ratio transmission: an inner member having a pair of inner complementary race rings thereon; an outer member around said inner member having a pair of outer complementary race rings thereon facing said inner race rings; balls arranged between said inner and outer race rings and in rolling engagement therewith; a third member between said inner and outer race rings and having spaces for said balls; means supporting two of said members so that they may revolve around the axis of said inner and outer members; means supporting the remaining of said members so as to have reaction against rotation; outer negative rate spring means urging said outer race rings toward each other; and inner negative rate spring means urging said inner race rings toward each other, said inner negative rate spring means is of a strength relative to said outer negative rate spring means to adjust the transmission to its low ratio state when there is no fluid pressure in said fluid expansible means.

14. In a variable ratio transmission: an inner member having a pair of inner complementary race rings thereon; an outer member around said inner member having a pair of outer complementary race rings thereon facing said inner race rings; balls arranged between said inner and outer race rings and in rolling engagement therewith; a third member between said inner and outer race rings and having spaces for said balls; means supporting two of said members so that they may revolve around the axis of said inner and outer members; means supporting the remaining of said members so as to have reaction against rotation; outer spring means urging said outer race rings toward each other; and inner spring means urging said inner race rings toward each other, said rate spring means is of a strength relative to said rate spring means to adjust the transmission to its low ratio state when there is no fluid pressure in said fluid expansible means.

References Cited in the file of this patent

UNITED STATES PATENTS

| | | |
|---|---|---|
| 1,387,550 | McDermott | Aug. 16, 1921 |
| 1,526,493 | Dolton | Feb. 17, 1925 |
| 2,162,719 | Hay | June 20, 1939 |
| 2,173,661 | Perrine | Sept. 19, 1939 |
| 2,255,420 | Graham | Sept. 9, 1941 |
| 2,308,475 | Fawkes | Jan. 12, 1943 |
| 2,325,193 | Nutt et al. | July 27, 1943 |
| 2,720,087 | Groene | Oct. 11, 1955 |

FOREIGN PATENTS

| | | |
|---|---|---|
| 282,491 | Switzerland | Aug. 16, 1952 |
| 446,140 | Germany | June 23, 1927 |
| 694,650 | Great Britain | June 22, 1953 |

Notice of Adverse Decision in Interference

In Interference No. 91,900 involving Patent No. 2,874,592, J. W. Oehrli, Self-controlled variable speed planetary type drive, final judgment adverse to the patentee was rendered Aug. 12, 1964, as to claim 9.
[*Official Gazette December 22, 1964.*]